United States Patent
Sams

(10) Patent No.: US 11,198,328 B2
(45) Date of Patent: Dec. 14, 2021

(54) TIRE WITH ELECTRONIC DEVICE HAVING A REINFORCING CORD ANTENNA

(71) Applicant: Bridgestone Americas Tire Operations, LLC, Nashville, TN (US)

(72) Inventor: Thomas A. Sams, Alliance, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 553 days.

(21) Appl. No.: 16/092,290

(22) PCT Filed: Feb. 9, 2017

(86) PCT No.: PCT/US2017/017130
§ 371 (c)(1),
(2) Date: Oct. 9, 2018

(87) PCT Pub. No.: WO2017/184237
PCT Pub. Date: Oct. 26, 2017

(65) Prior Publication Data
US 2021/0023885 A1  Jan. 28, 2021

Related U.S. Application Data

(60) Provisional application No. 62/324,538, filed on Apr. 19, 2016.

(51) Int. Cl.
*B29D 30/38* (2006.01)
*B60C 9/00* (2006.01)
(Continued)

(52) U.S. Cl.
CPC ............ *B60C 9/2006* (2013.01); *B29D 30/38* (2013.01); *B60C 23/0452* (2013.01);
(Continued)

(58) Field of Classification Search
CPC .............. H01Q 1/2241; B60C 23/0452; B60C 2019/004; B29D 30/0061; B29D 30/38;
(Continued)

(56) References Cited

U.S. PATENT DOCUMENTS

| 5,218,861 A | 6/1993 | Brown et al. |
| 5,348,067 A | 9/1994 | Myatt |

(Continued)

FOREIGN PATENT DOCUMENTS

| CN | 101168344 A | 4/2008 |
| CN | 100408360 | 6/2008 |

(Continued)

OTHER PUBLICATIONS

Callan, Feargel, Supplementary European Search Report, dated Nov. 21, 2019, p. 1-8, European Patent Office, Munich, Germany.

(Continued)

*Primary Examiner* — Justin R Fischer
*Assistant Examiner* — Philip N Schwartz

(57) ABSTRACT

A tire includes an electronic device, such as a RFID chip, within the body of the tire. For particular embodiments, a RFID chip is disposed within a tire belt. The RFID chip may be disposed on an inner or outer belt. The RFID chip is connected to at least one steel cords forming an antenna for the RFID chip. The steel cords are disposed at a first angle and second angle with respect to the tire equator. A method of joining the RFID chip to a tire cord is also provided.

6 Claims, 4 Drawing Sheets

(51) Int. Cl.
*H01Q 1/22* (2006.01)
*B60C 9/20* (2006.01)
*B60C 23/04* (2006.01)
*G06K 19/077* (2006.01)
*B60C 11/03* (2006.01)
*B29D 30/00* (2006.01)

(52) U.S. Cl.
CPC ... *G06K 19/0775* (2013.01); *G06K 19/07764* (2013.01); *G06K 19/07773* (2013.01); *H01Q 1/2208* (2013.01); *B29D 2030/0077* (2013.01); *B60C 11/0306* (2013.01); *B60C 2009/2016* (2013.01); *B60C 2009/2022* (2013.01); *B60C 2200/06* (2013.01); *H01Q 1/2241* (2013.01)

(58) Field of Classification Search
CPC .... B29D 2030/0077; B29D 2030/0083; G06K 19/0775; G06K 19/07764; G06K 19/07773
See application file for complete search history.

(56) References Cited

U.S. PATENT DOCUMENTS

| | | | |
|---|---|---|---|
| 5,491,483 A * | 2/1996 | D'Hont | B65F 1/1484 342/42 |
| 6,581,657 B1 | 6/2003 | Brown | |
| 7,050,017 B2 | 5/2006 | King et al. | |
| 7,220,330 B2 | 5/2007 | Tubb et al. | |
| 7,926,527 B2 | 4/2011 | Kleckner | |
| 8,157,172 B2 | 4/2012 | Fenkanyn | |
| 8,231,060 B2 | 7/2012 | Tucker | |
| 8,511,355 B2 | 8/2013 | Kleckner | |
| 8,833,409 B2 | 9/2014 | Kleckner | |
| 2004/0172180 A1* | 9/2004 | Bowman | B60C 23/0433 701/31.4 |
| 2005/0093761 A1* | 5/2005 | King | H01Q 1/2241 343/873 |
| 2005/0133132 A1 | 6/2005 | Girard | |
| 2007/0175555 A1 | 8/2007 | Myatt | |
| 2010/0007465 A1 | 1/2010 | Benedict | |
| 2010/0123584 A1 | 5/2010 | Lionetti et al. | |
| 2010/0156641 A1 | 6/2010 | Lionetti et al. | |

FOREIGN PATENT DOCUMENTS

| | | |
|---|---|---|
| WO | 2004058518 | 7/2004 |
| WO | 2005080098 | 9/2005 |

OTHER PUBLICATIONS

International Search Report and Written Opinion; Corresponding PCT Application No. PCT/US2017/017130 (filed Feb. 9, 2017).
Machine translation of CN101168344A published on Apr. 30, 2008 owned by Hankook Tire Co Ltd.

* cited by examiner

TIRE WITH ELECTRONIC DEVICE HAVING A REINFORCING CORD ANTENNA

FIELD OF INVENTION

The present disclosure is directed to tires having electronic devices. More particularly, the present disclosure is directed to tires and tire systems having electronic devices that are incorporated into the tire. The tires may be pneumatic or non-pneumatic.

BACKGROUND

Known tires and tire systems incorporate electronic devices. These devices are used for a variety of purposes, such as product identification, memory storage, and tire analysis. The electronic devices are incorporated into tires and tire systems at various locations on tires, vehicles, or attendant proximity readers. Known electronic devices include, without limitation, RFID chips and antennas.

SUMMARY OF THE INVENTION

In one embodiment, a tire includes a first annular bead and a second annular bead, a body ply extending between the first annular bead and the second annular bead, a first annular belt, disposed radially upward of the body ply and extending axially across a portion of the body ply, wherein the first annular belt includes a first plurality of substantially parallel steel cords which are disposed at a first angle with respect to the tire equator; a second annular belt disposed radially upward of the first annular belt and extending axially across a portion of the first annular belt, wherein the second annular belt includes a second plurality of substantially parallel steel cords which are disposed at a second angle with respect to the tire equator, and the first angle is not equal to the second angle; a circumferential tread disposed radially upward of the second annular belt and extending axially across a portion of the body ply, a first sidewall extending between the first annular bead and a first shoulder, the first shoulder being associated with the circumferential tread, and a second sidewall extending between the second annular bead and a second shoulder, the second shoulder being associated with the circumferential tread. The tire further includes a radio-frequency identification (RFID) chip disposed radially within one of the first annular belt and the second annular belt, and disposed axially across a portion of the circumferential tread, wherein the RFID chip is connected to at least one steel cord.

In another embodiment, a reinforcing belt for a tire application includes a plurality of reinforcing cords disposed in an elastomeric layer, wherein the elastomeric layer has a length, width, and height, and the reinforcing cords of the plurality of reinforcing cords are evenly distributed across the width of the elastomeric layer; an RFID chip, wherein the RFID chip is connected to a first reinforcing cord in the plurality of reinforcing cords. The first reinforcing cord is configured to receive or transmit RFID signals.

In a different embodiment, a method of joining an RFID chip to a tire cord comprises severing the tire cord and separating the severed ends of the tire cord; removing a cord segment having a length substantially equal to the length of the RFID chip; introducing the severed ends of the tire cord to the RFID chip; connecting the severed ends of the tire cord to the RFID chip; and calendaring the tire cord into an elastomeric compound.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"RFID" refers to radio-frequency identification.

"Sidewall" refers to that portion of the tire between the tread and the bead.

"Tread" refers to that portion of the tire that comes into contact with the road or ground under normal inflation and normal load.

"Tread width" refers to the width of the ground contact area of a tread which contacts the road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
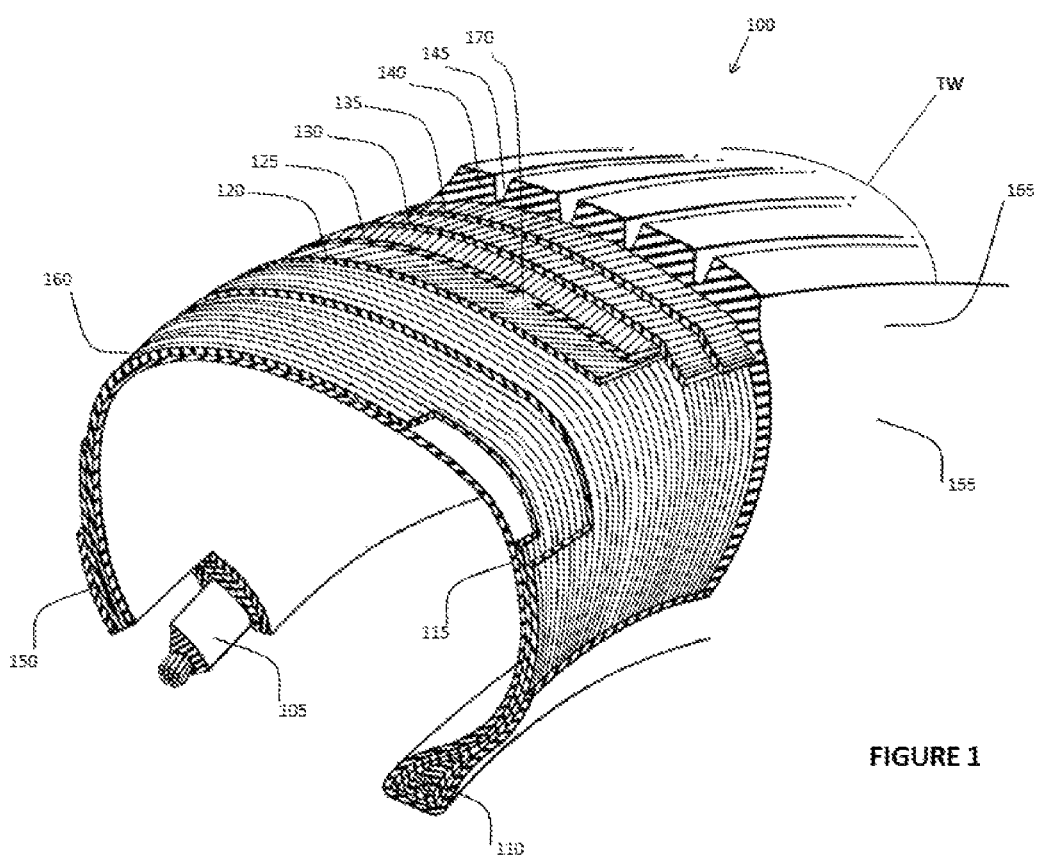
FIG. 1 is a peel-away cross-sectional perspective view of an embodiment of a tire including an electronic device.

FIG. 1 is a peel-away cross-sectional perspective view of an embodiment of a new tire 100. As shown, tire 100 includes a first annular bead 105 and a second annular bead 110. The annular beads, in part, secure the tire to a wheel. In an alternative embodiment (not shown), the tire comprises four or more beads.

As shown, tire 100 further includes a body ply 115 extending between first annular bead 105 and second annular bead 110. Body ply 115 forms an annulus and imparts shape to the tire. As one of ordinary skill in the art will understand, body ply 115 may contain reinforcing cords or fabric (not shown). In alternative embodiments (not shown), various turn-up and turn-down configurations, or multiple body plies, are used.

Tire 100 further comprises a first annular belt 120 and a second annular belt 125. First annular belt 120 is disposed radially upward of body ply 115 and extends axially across a portion of body ply 115. As one of ordinary skill in the art will understand, first annular belt 120 includes a first plurality of steel cords (not shown in FIG. 1). Second annular belt 125 is disposed radially upward of the first annular belt 120 and extends axially across a portion of the first annular belt 120. As one of ordinary skill in the art will understand, second annular belt 125 includes a second plurality of steel cords (also not shown in FIG. 1). In one alternative embodiment, the tire contains a third annular belt. In another alternative embodiment, the tire contains a fourth annular belt. In each of these alternative embodiments, the annular belts may contain steel cords or fabric reinforcement.

As shown, tire 100 further comprises a first cap ply 130 and second cap ply 135. First cap ply 130 is disposed radially upward of second annular belt 125 and extends axially across a portion of body ply 115. Second cap ply 135 is disposed radially upward of the first cap ply 130 and extends axially across a portion of the first cap ply 130. The cap plies typically contain fibers that run parallel to the tire's equator. In an alternative embodiment (not shown), the cap plies may be omitted.

Tire 100 further comprises a circumferential tread 140 having circumferential grooves 145. Circumferential tread 140 is disposed radially upward of second annular belt 125 and extends axially across a portion of body ply 115. Circumferential grooves 145 divide circumferential tread 140 into ribs. In FIG. 1, TW denotes the tread width of circumferential tread 140. It should be understood that the tread shown in FIG. 1 is merely exemplary, and any known tread elements, such as blocks, lugs, grooves, and sipes may be employed.

As one of ordinary skill in the art will understand, circumferential tread 140 is affixed to tire 100 when tire 100 is new. In an alternative embodiment (not shown), the circumferential tread is affixed as a retread.

Tire 100 further comprises a first sidewall 150 and a second sidewall 155. First sidewall 150 extends between the first annular bead 105 and a first shoulder 160, which is proximately associated with an edge of circumferential tread 140. Second sidewall 155 extends between the second annular bead 110 and a second shoulder 165, which is proximately associated with an opposite edge of circumferential tread 140. In an alternative embodiment (not shown), the sidewall is proximately associated with an undertread (not shown).

Tire 100 further comprises an RFID chip 170. As shown, with respect to the radial direction, RFID chip 170 is disposed in the second annular belt 125 (radially between the first annular belt 120 and circumferential tread 140); RFID chip 170 is further disposed below the center circumferential rib. In an alternative embodiment (not shown), the RFID chip is disposed in a radially lower belt. In alternative embodiments (not shown) where the tire contains three or more annular belts, the RFID chip is disposed in a radially upper belt.

With respect to the axial direction, RFID chip 170 is disposed within the middle two-thirds of the tread width, TW. However, the RFID chip is not limited to a particular axial location. In an alternative embodiment (not shown), the RFID chip is disposed below a circumferential groove in the circumferential tread. In an alternative embodiment where the circumferential tread includes at least three circumferential ribs, the RFID chip is disposed below one of the circumferential ribs (i.e., not below a circumferential groove). In another alternative embodiment, where the circumferential tread includes at least one circumferential groove, the RFID chip is disposed an axial distance of at least 2% of the tire tread width from a circumferential groove edge. In another alternative embodiment, the RFID chip is disposed below an outer third of the tread width. In yet another embodiment, multiple RFID chips may be employed at any location. For example, a first RFID chip may be disposed below a middle third of the tread width and a second RFID chip may be disposed below an outer third of the tread width. As another example, an RFID chip may be disposed below each rib in a tread pattern.

With respect to the circumferential direction, RFID chip 170 may be disposed at any location on the tire circumference. In one embodiment (not shown), the RFID chip is not disposed at a belt-edge splice. In an alternative embodiment (also not shown), multiple RFID chips are disposed circumferentially about the tire. In multiple-chip embodiments, the chips may be distributed evenly about the tire circumference or at a predetermined distances (e.g., one chip is disposed every 20 cm, 40 cm, 80 cm, etc.).

RFID chip 170 includes a casing that surrounds the chip. As shown, the casing is rectangular. As one of ordinary skill in the art will understand, the casing may be a variety of shapes. In alternative RFID chip embodiments, a casing, or portions of a casing, may be omitted.

RFID chip 170 further includes an antenna (not shown). In one embodiment, a steel cord from a plurality of substantially parallel steel cords forms the antenna. In another embodiment, a cord strand from a plurality of substantially parallel steel cords forms the antenna. In yet another embodiment, a cord filament from a plurality of substantially parallel steel cords forms the antenna.

In the embodiments depicted in FIG. 1, RFID chip 170 does not move within tire 100, and it does not escape, eject from, or leave tire 100 after a period of use. RFID chip 170 does not intentionally cease operation when it is eroded or compromised.

As one of ordinary skill in the art will understand, in additional embodiments, an electronic device may replace the RFID chip. Exemplary electronic devices include, without limitation, interrogators and integrated circuits.

Figure 2:
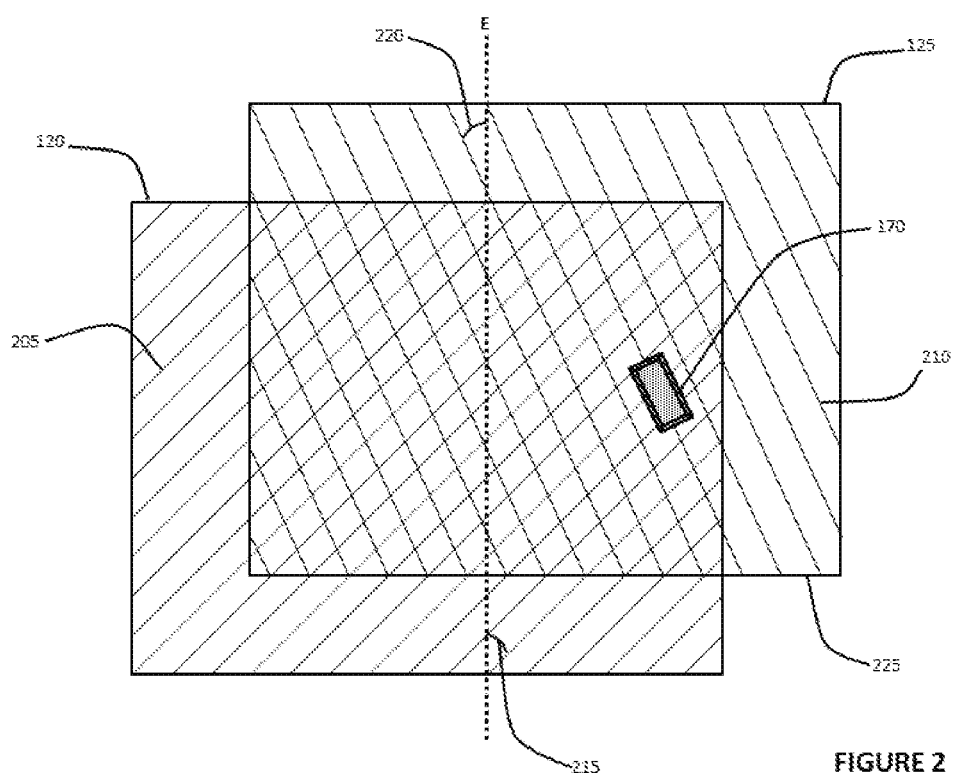
FIG. 2 is a schematic drawing of a cross-sectional top view of belt layers and reinforcement cords disposed in the representative embodiment of the tire shown in FIG. 1.

FIG. 2 is a schematic drawing of a cross-sectional top view of belt layers and reinforcement cords disposed in the representative embodiment of the tire shown in FIG. 1.

As shown, first annular belt 120 and second annular belt 125 are represented by flat, offset, rectangular blocks. The blocks are offset for illustrative purposes.

First annular belt 120 includes a first plurality of steel cords 205, which are depicted by angled, parallel lines. Similarly, second annular belt 125 includes a second plurality of steel cords 210, which are also depicted by angled, parallel lines. One of ordinary skill in the art will understand that the steel cords are disposed within the annular belts. In alternative embodiments (not shown), the steel cords are replaced with reinforcing cords or fabric plies.

The first plurality of steel cords 205 intersect the equatorial plane E at a first angle 215, and the second plurality of steel cords 210 intersect the equatorial plane E at a second angle 220 (the first and second angles shown in FIG. 2 are exaggerated for illustrative purposes). In the embodiment depicted in FIG. 2, the first angle is greater than the second angle. In a second embodiment (not shown), the first angle is between 0 and 20° and the second angle is between −60 and −90°. In a third embodiment, the first angle is between 0 and 20° and the second angle is between −75 and −90°. In a fourth embodiment, the first angle is between 0 and 20° and the second angle is between 1 and 5° less than the first angle. In an alternative embodiment with three belts (also not shown), a third annular belt includes a third plurality of steel cords that intersect the the equatorial plane at a third angle. The third angle is between 1 and 5° less than the first angle and between 0 and 5° less than the second angle.

FIG. 2 also shows a belt edge 225 and RFID chip 170. Belt edge 225 is depicted on second annular belt 125. While belt edge 225 is shown as intersecting the equatorial plane E at a perpendicular angle, the belt edge may intersect the equatorial plane E at any angle. As shown, RFID chip 170 is not disposed at a belt-edge splice. In one embodiment (not shown), the RFID chip is completely embedded in the radially upper annular belt. In a different embodiment, the RFID chip protrudes from a surface of the radially upper annular belt. In alternative embodiments, the RFID chip is located on a radially lower annular belt.

Figure 3:
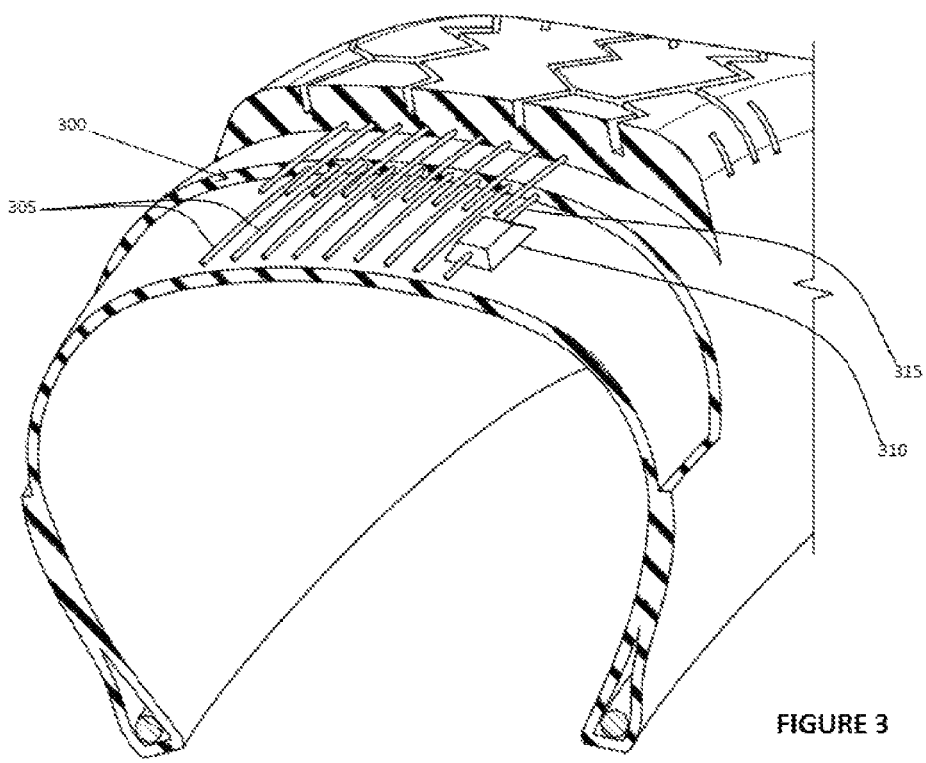
FIG. 3 is a peel-away cross-sectional perspective view of a reinforcing belt for a tire application.

FIG. 3 is a peel-away cross-sectional perspective view of a reinforcing belt 300 for a tire application.

As shown, reinforcing belt 300 comprises a plurality of reinforcing cords 305. The plurality of reinforcing cords 305 are disposed in an elastomeric layer that has a length, width, and height. The reinforcing cords of the plurality of reinforcing cords 305 are evenly distributed across the width of the elastomeric layer. As one of ordinary skill in the art will understand, the reinforcing cord may be made from a variety of materials.

Reinforcing belt 300 further includes an RFID chip 310. As shown, RFID chip 310 is connected to a first reinforcing cord 315 in the plurality of reinforcing cords. The first reinforcing cord, by this connection, forms an antenna for the RFID chip. In an alternative embodiment (not shown), the RFID chip is connected to two or more reinforcing cords, with the two or more reinforcing cords forming an antenna for the RFID chip. Thus, the first reinforcing cord is configured to receive or transmit RFID signals. In another embodiment, the RFID chip is connected to a cord strand of the reinforcing cord. The cord strand or reinforcing cord then forms an antenna for the RFID chip. In another embodiment, the RFID chip is connected to a cord filament of the reinforcing cord. The cord filament or reinforcing cord then forms an antenna for the RFID chip.

In additional alternative embodiments (not shown), the RFID chip is integrated with a reinforcing cord. In one such embodiment, the RFID solder joins the RFID chip to a reinforcing cord. In another such embodiment, conductive adhesive joins the RFID chip to a reinforcing cord. In yet another such embodiment, the RFID chip and reinforcing cord are connected via friction fit.

With continued reference to FIG. 3 and RFID chip 310, RFID chip 310 is shown as rectangular. In one embodiment (not shown), length of the RFID chip 310 is 0.012-0.032% of the section width. In a second embodiment, the length of the RFID chip is 0.022-0.075% of the section width. In alternative embodiments, the RFID chip is not rectangular.

Figure 4:
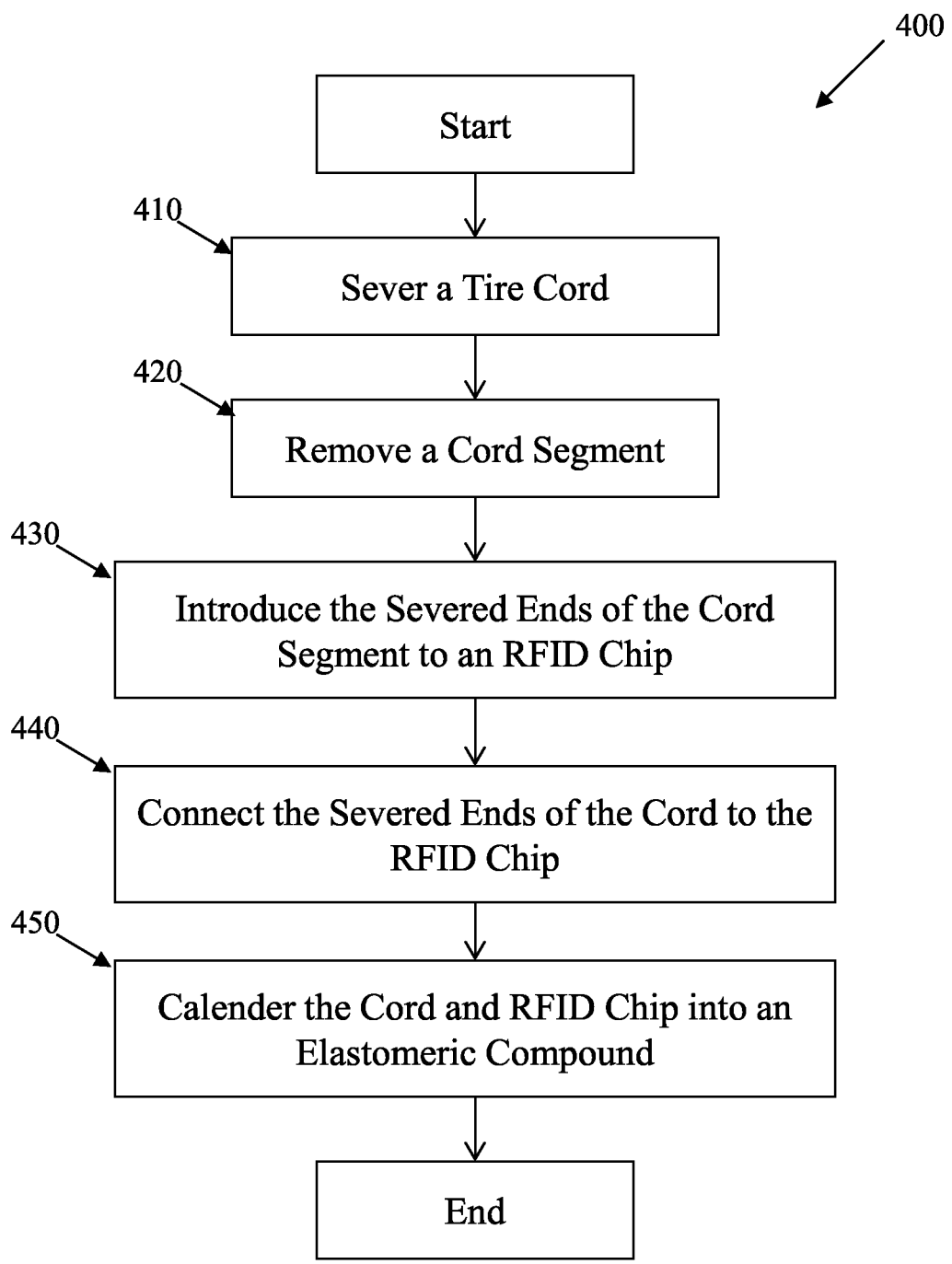
FIG. 4 is a flowchart describing one embodiment of a method of joining an RFID chip to a tire cord.

FIG. 4 is a flowchart describing one embodiment of a method 400 of joining an RFID chip to a tire cord.

In FIG. 4, method 400 starts with severing a tire cord 410. The severed ends of the tire cord are then separated. In one embodiment, the severing step is performed on a cord strand, by severing a strand of the tire cord. In another embodiment, the severing step is performed on a cord filaments, by severing step is performed on a cord filament.

Method 400 then continues with removing a cord segment having a length substantially equal to the length of the RFID chip 420. In one embodiment, the cord length of cord segment removed ranges between 80-120% of the length of the RFID chip. In another embodiment, the cord length of cord segment removed ranges between 90-95% of the length of the RFID chip. In an alternative embodiment (not shown), the removing step is omitted, and the severed ends of the tire cord are positioned a distance a length substantially equal to the length of the RFID chip apart from each other.

Method 400 further continues with introducing the severed ends of the tire cord to the RFID chip 430. In introducing step 430, the severed ends are positioned in close proximity to the RFID chip in preparation for further processing. The severed ends may be positioned by, without limitation, moving the severed ends of the cord to the RFID chip or by moving the RFID chip to the severed ends.

Method 400 continues with connecting the severed ends of the tire cord to the RFID chip 440. In one embodiment, the severed ends are connected by soldering the severed ends of the tire cord onto the RFID chip. In another embodiment, the severed ends are connected by gluing the severed ends of the tire cord onto the RFID chip. In a different embodiment, the severed ends are connected by forcing the severed ends into an interference fit.

Method 400 then continues with calendering 450 the tire cord into an elastomeric compound. In calendering step 450, the tire cord is encased with an elastomer. The encased tire cord and RFID chip may then be used in further manufacturing activities.

EXAMPLES

Exemplary tires with the four following constructions were simulated.

Tire 1 was simulated as having two steel belts. The first angle of the parallel steel cords in the first belt was set at 0° with respect to the equatorial plane, and the second of angle of the parallel steel cords in the second belt was set at −90° with respect to the equatorial plane.

Tire 2 was simulated as having two steel belts. The first angle of the parallel steel cords in the first belt was set at 0° with respect to the equatorial plane, and the second of angle of the parallel steel cords in the second belt was set at −80° with respect to the equatorial plane.

Tire 3 was simulated as having two steel belts. The first angle of the parallel steel cords in the first belt was set at 0° with respect to the equatorial plane, and the second of angle of the parallel steel cords in the second belt was set at −70° with respect to the equatorial plane.

Tire 4 was simulated as having two steel belts. The first angle of the parallel steel cords in the first belt was set at 0° with respect to the equatorial plane, and the second of angle of the parallel steel cords in the second belt was set at −60° with respect to the equatorial plane.

For each tire simulation, dipole gain was analyzed and recorded. The results are reported in Table 1:

TABLE 1

| Belt Angle Difference (degrees) | Dipole Gain (dBi) |
|---|---|
| 90 | 16.4 |
| 80 | 9.2 |
| 70 | 8.5 |
| 60 | 2.6 |

As one of ordinary skill in the art would understand, a variety of factors influence RFID antenna performance. The four tire embodiments described in Table 1 are for illustrative purposes and are not intended to be limiting.

Further, as one of ordinary skill in the art would also understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized in retreading applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

The invention claimed is:

1. A method of joining an RFID chip to a tire cord comprising:
    severing the tire cord and separating the severed ends of the tire cord;
    removing a cord segment having a length substantially equal to the length of the RFID chip;
    introducing the severed ends of the tire cord to the RFID chip;
    connecting the severed ends of the tire cord to the RFID chip;
    calendaring the tire cord into an elastomeric compound.

2. The method of claim 1, wherein the connecting step further comprises soldering the severed ends of the tire cord onto the RFID chip.

3. The method of claim 1, wherein the connecting step further comprises gluing the severed ends of the tire cord onto the RFID chip.

4. The method of claim 1, wherein the connecting step further comprises forcing the severed ends into an interference fit.

5. The method of claim 1, wherein the severing step is performed on a cord strand.

6. The method of claim 1, wherein the severing step is performed on a cord filament.

* * * * *